United States Patent
Lee et al.

(10) Patent No.: US 11,762,960 B2
(45) Date of Patent: Sep. 19, 2023

(54) SECURE FILE DISTRIBUTION

(71) Applicant: LENOVO (Singapore) PTE. LTD., New Tech Park (SG)

(72) Inventors: Jonathan C. Lee, Cary, NC (US); Philip L. Childs, Fort Wayne, IN (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 298 days.

(21) Appl. No.: 16/832,126

(22) Filed: Mar. 27, 2020

(65) Prior Publication Data
US 2021/0303659 A1    Sep. 30, 2021

(51) Int. Cl.
G06F 21/10     (2013.01)
G06F 16/176    (2019.01)
G06F 21/62     (2013.01)
G06T 19/00     (2011.01)
H04L 29/08     (2006.01)
H04L 67/06     (2022.01)

(52) U.S. Cl.
CPC ............ G06F 21/10 (2013.01); G06F 16/176 (2019.01); G06F 21/6209 (2013.01); G06T 19/006 (2013.01); H04L 67/06 (2013.01); G06F 2221/0784 (2013.01)

(58) Field of Classification Search
CPC ............ G06F 21/10; G06F 2221/0784; G06F 21/6209; G06F 16/176; H04L 67/06; G06T 19/006
See application file for complete search history.

(56) References Cited

U.S. PATENT DOCUMENTS

| | | | | |
|---|---|---|---|---|
| 2014/0349269 | A1* | 11/2014 | Canoy | G06N 20/00 434/322 |
| 2016/0196435 | A1* | 7/2016 | Oh | H04W 12/33 713/193 |
| 2019/0149594 | A1* | 5/2019 | Kwon | H04L 67/06 709/231 |

FOREIGN PATENT DOCUMENTS

| | | | | |
|---|---|---|---|---|
| KR | 101160224 B1 * | 6/2012 | | G06T 7/20 |
| WO | 00/04681 A1 | 1/2000 | | |
| WO | WO-2019213021 A1 * | 11/2019 | | |

OTHER PUBLICATIONS

"Integrating 3D Reconstruction and Virtual Reality: A New Approach for Immersive Teleoperation"—Fdez et al, Centro De Autom'atica y Rob'otica, UPM-CSIC, Jan. 2018 https://www.researchgate.net/publication/321976405_Integrating_3D_Reconstruction_and_Virtual_Reality_A_New_Approach_for_Immersive (Year: 2018).*

(Continued)

*Primary Examiner* — Randy A Scott
(74) *Attorney, Agent, or Firm* — Kunzler Bean & Adamson; Bruce R. Needham

(57) ABSTRACT

Apparatuses, methods, systems, and program products are disclosed for secure file distribution. An apparatus includes a processor and a memory that stores code executable by the processor. The code is executable by the processor to divide a file that is intended for a recipient into a plurality of portions. The code is executable by the processor to associate each of the plurality of portions with a different one of the recipient's electronic devices. The code is executable by the processor to assemble the plurality of portions of the file for the recipient in response to authenticating the recipient on each of the recipient's electronic devices that is associated with a portion of the plurality of portions of the file.

19 Claims, 6 Drawing Sheets

(56) References Cited

OTHER PUBLICATIONS

"A Method for 3D Reconsrutction and Virtual Reality Analysis of Gilal and Neuronal Cells"—Cali et al, Biological and Environmental Sciences and Engineering Division, King Abdullah University of Science and Technology, Sep. 28, 2019 https://www.jove.com/v/59444/a-method-for-3d-reconstruction-virtual-real (Year: 2019).*

* cited by examiner

SECURE FILE DISTRIBUTION

FIELD

The subject matter disclosed herein relates to file management and more particularly relates to securely distributing and viewing files.

BACKGROUND

Certain files/documents may need to be sent securely so that they files/documents are not seen in the open, are not intercepted, and/or cannot be misappropriated by users who are not authorized to view the files/documents.

BRIEF SUMMARY

Apparatuses, methods, systems, and program products are disclosed for secure file distribution. An apparatus, in one embodiment, includes a processor and a memory that stores code executable by the processor. In certain embodiments, the code is executable by the processor to divide a file that is intended for a recipient into a plurality of portions. In one embodiment, the code is executable by the processor to associate each of the plurality of portions with a different one of the recipient's electronic devices. In some embodiments, the code is executable by the processor to assemble the plurality of portions of the file for the recipient in response to authenticating the recipient on each of the recipient's electronic devices that is associated with a portion of the plurality of portions of the file.

A method for secure file distribution, in one embodiment, includes dividing, by a processor, a file that is intended for a recipient into a plurality of portions. The method, in further embodiments, includes associating each of the plurality of portions with a different one of the recipient's electronic devices. In certain embodiments, the method includes assembling the plurality of portions of the file for the recipient in response to authenticating the recipient on each of the recipient's electronic devices that is associated with a portion of the plurality of portions of the file.

A computer program product for secure file distribution, in one embodiment, includes a computer readable storage medium having program instructions embodied therewith. In certain embodiments, the program instructions are executable by a processor to cause the processor to divide a file that is intended for a recipient into a plurality of portions. In some embodiments, the program instructions are executable by a processor to cause the processor to associate each of the plurality of portions with a different one of the recipient's electronic devices. In further embodiments, the program instructions are executable by a processor to cause the processor to assemble the plurality of portions of the file for the recipient in response to authenticating the recipient on each of the recipient's electronic devices that is associated with a portion of the plurality of portions of the file.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
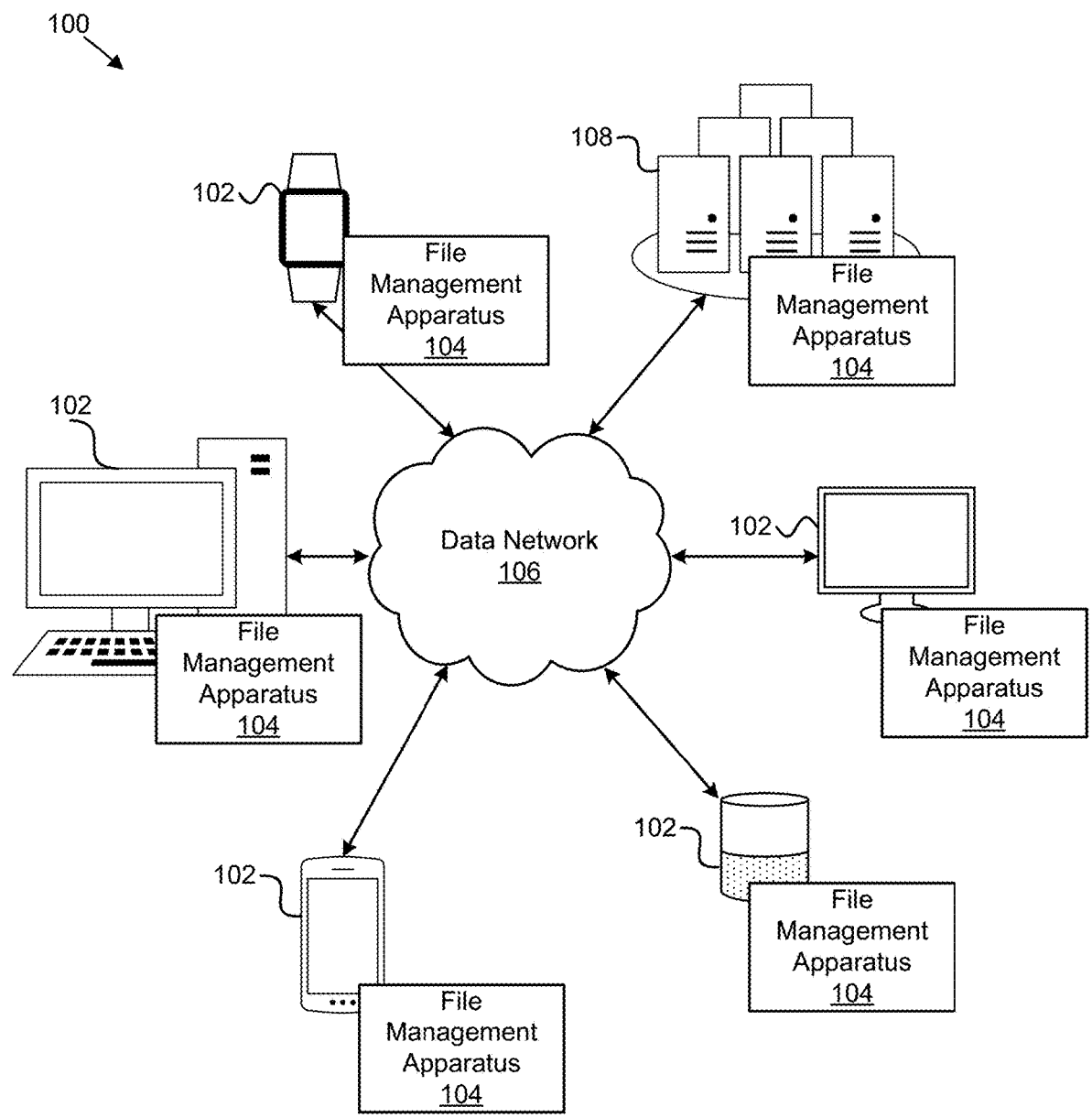
FIG. 1 is a schematic block diagram illustrating one embodiment of a system for secure file distribution.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to divide a file that is intended for a recipient into a plurality of portions. In one embodiment, the code is executable by the processor to associate each of the plurality of portions with a different one of the recipient's electronic devices. In some embodiments, the code is executable by the processor to assemble the plurality of portions of the file for the recipient in response to authenticating the recipient on each of the recipient's electronic devices that is associated with a portion of the plurality of portions of the file.

In one embodiment, the code is executable by the processor to authenticate the recipient on the recipient's electronic device that is used to view the assembled file prior to providing access to the assembled file. In certain embodiments, the code is executable by the processor to verify that the recipient successfully authenticated at each of the recipient's electronic devices that are associated with each portion of the plurality of portions prior to assembling the plurality of portions of the file for the recipient.

In one embodiment, the code is executable by the processor to delete the assembled file after a period of time, which is triggered in response to the recipient first viewing the file. In certain embodiments, the code is executable by the processor to delete a portion of the plurality of portions of the file in response to the portion being accessed to assemble the file. In some embodiments, the code is executable by the processor to determine a predefined order for accessing the plurality of portions for assembling the file such that one portion of the plurality of portions is not accessible until a previous portion of the plurality of portions in the predefined order has been accessed.

In one embodiment, the code is executable by the processor to begin a timer for expiring one or more portions of the plurality of portions in response to one portion of the plurality of portions being accessed for assembling the file. In certain embodiments, the code is executable by the processor to randomly select the recipient's electronic devices that are associated with the plurality of portions and randomly associate each of the plurality of portions with the different one of the randomly selected recipient's electronic devices.

In one embodiment, the code is executable by the processor to authenticate the recipient on each of the recipient's electronic devices in response to the recipient using credentials to one or more of unlock the electronic device and log into an application on the electronic device that verifies the recipient's identity. In various embodiments, the code is executable by the processor to assemble and make available the file on one of the recipient's electronic devices that is not associated with a portion of the plurality of portions of the file.

In one embodiment, the code is executable by the processor to store the assembled file in volatile memory of one of the recipient's electronic devices that used to view the file. In some embodiments, the code is executable by the processor to store the plurality of portions on one or more of a device that is remote to the recipient's electronic devices and on the recipient's electronic devices that are associated with the portions.

In one embodiment, the recipient's electronic device that is used to view the assembled file comprises a head-mounted display executing a mixed reality environment comprising one or more of a virtual reality environment and an augmented reality environment. In some embodiments, the code is executable by the processor to authenticate the recipient wearing the head-mounted display using biometric information captured from the recipient's eyes.

A method for secure file distribution, in one embodiment, includes dividing, by a processor, a file that is intended for a recipient into a plurality of portions. The method, in further embodiments, includes associating each of the plurality of portions with a different one of the recipient's electronic devices. In certain embodiments, the method includes assembling the plurality of portions of the file for the recipient in response to authenticating the recipient on each of the recipient's electronic devices that is associated with a portion of the plurality of portions of the file.

In one embodiment, the method includes authenticating the recipient on the recipient's electronic device that is used to view the assembled file prior to providing access to the assembled file. In some embodiments, the method includes verifying that the recipient successfully authenticated at each of the recipient's electronic devices that are associated with each portion of the plurality of portions prior to assembling the plurality of portions of the file for the recipient.

In one embodiment, the method includes deleting the assembled file after a period of time, which is triggered in response to the recipient first viewing the file. In some embodiments, the method includes deleting a portion of the plurality of portions of the file in response to the portion being accessed to assemble the file.

A computer program product for secure file distribution, in one embodiment, includes a computer readable storage medium having program instructions embodied therewith. In certain embodiments, the program instructions are executable by a processor to cause the processor to divide a file that is intended for a recipient into a plurality of portions. In some embodiments, the program instructions are executable by a processor to cause the processor to associate each of the plurality of portions with a different one of the recipient's electronic devices. In further embodiments, the program instructions are executable by a processor to cause the processor to assemble the plurality of portions of the file for the recipient in response to authenticating the recipient on each of the recipient's electronic devices that is associated with a portion of the plurality of portions of the file.

FIG. 1 is a schematic block diagram illustrating one embodiment of a system 100 for secure file distribution. In one embodiment, the system 100 includes one or more information handling devices 102, one or more file management apparatuses 104, one or more data networks 106, and one or more servers 108. In certain embodiments, even though a specific number of information handling devices 102, file management apparatuses 104, data networks 106, and servers 108 are depicted in FIG. 1, one of skill in the art will recognize, in light of this disclosure, that any number of information handling devices 102, file management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the file management apparatus 104 is configured to securely distribute or send a file by a file that is intended for a recipient into a plurality of portions, associating each of the plurality of portions with a different one of the recipient's electronic devices, and assembling the plurality of portions of the file for the recipient in response to authenticating the recipient on each of the recipient's electronic devices that is associated with a portion of the plurality of portions of the file. The file management apparatus 104, including its various sub-modules, may be located on one or more information handling devices 102 in the system 100, one or more servers 108, one or more network devices, and/or the like. The file management apparatus 104 is described in more detail below with reference to FIGS. 2 and 3.

In various embodiments, the file management apparatus 104 may be embodied as part of an information handling device 102 such as a smart device, a network device, an Internet of Things device, a computing device, or as a hardware appliance that can be installed or deployed on an information handling device 102, on a server 108, on a user's mobile device, on a display, or elsewhere on the data network 106. In certain embodiments, the file management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the file management apparatus 104 may include a power interface, a wired and/or wireless network interface, a graphical interface that attaches to a display, and/or a semiconductor integrated circuit device as described below, configured to perform the functions described herein with regard to the file management apparatus 104.

The file management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the file management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the file management apparatus 104.

The semiconductor integrated circuit device or other hardware appliance of the file management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the file management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like files and content to a different device such as documents, videos, music, podcasts, images, games, web pages, augmented and/or virtual reality environments, and/or the like.

Figure 2:
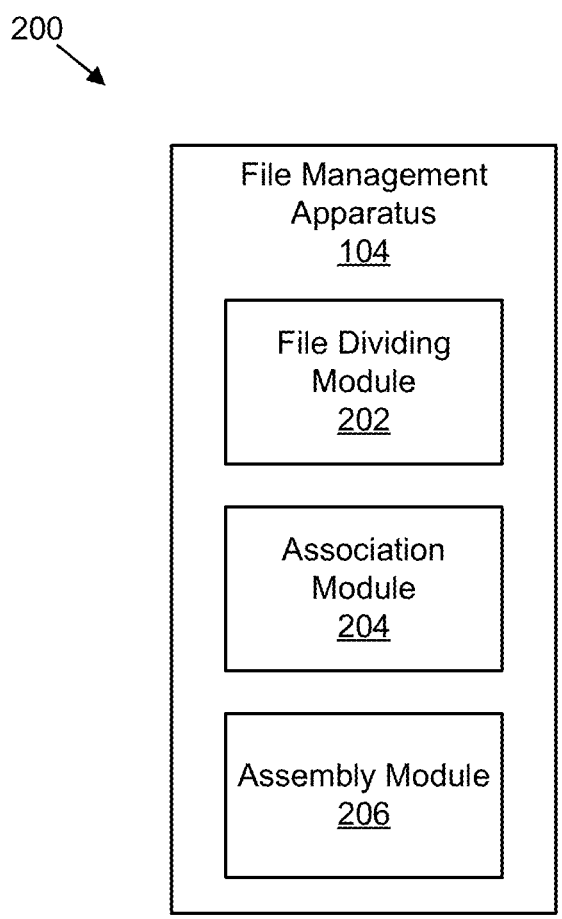
FIG. 2 is a schematic block diagram illustrating one embodiment of an apparatus for secure file distribution.

FIG. 2 is a schematic block diagram illustrating one embodiment of an apparatus 200 for secure file distribution. In one embodiment, the apparatus 200 includes an instance of a file management apparatus 104. In one embodiment, the file management apparatus 104 includes one or more of a file dividing module 202, an association module 204, and an assembly module 206, which are described in more detail below.

In one embodiment, the file dividing module 202 is configured to divide a file that is intended for a recipient into a plurality of portions. The file, in one embodiment, may be a document, an image, a PDF file, a music file, a video file, a web page, and/or other digital files. The file may be uploaded to a storage location where it can be downloaded or accessed by other recipients. The file may be sent as an attachment to an electronic message sent to a recipient such as an email, instant message, social media message, push notification, text message, and/or the like. In such an embodiment, the file dividing module 202 may intercept or process the file prior to the electronic message being sent to the recipient.

As described in more detail below, instead of sending the complete original file to the recipient as a single file (or allowing a recipient to download the complete original file as a single file), the portions of the file are sent to different devices that belong to the recipient so that the complete file is not sent as a single file. The recipient then needs to access each of his/her devices to access the portions of the file so that the file can be reassembled from the portions. In this manner, a file can be sent securely over a data network because even if one portion is intercepted or misappropriated, the complete file cannot be viewed without having access to the other portions of the file.

The file dividing module 202 may divide the file into a plurality of different portions, segments, parts, and/or the like. For example, the file dividing module 202 may divide the file into different portions using a bitwise pattern (e.g., every other bit or every two bits, or the like); using a word pattern for a text file (e.g., every other word or every two words, or the like); using a pixel pattern for an image file (e.g., every other pixel or every two pixels, or the like); and/or the like. The file dividing module 202, in certain embodiments, uses a completely random pattern for dividing the file.

The file dividing module 202, in one embodiment, makes copies of the data that is divided from the original file so that the original file is not impacted by the division of the file. In other words, the original file maintains its original state and the data of the original file is divided and copied into different portions of data. The portions may comprise information or metadata for re-assembling the portions to arrive at the original file. The metadata may include an order for re-assembling the portions, a position in the file (e.g., a position in a bitmap for the file, a position for a pixel, a position of a word/sentence in the file, and/or the like), which is used to re-assemble the file from the plurality of portions.

In one embodiment, the association module 204 is configured to associate each of the plurality of portions of the file with a different one of the recipient's electronic devices. For example, the recipient may have a smart phone, a tablet computer, a desktop computer, a laptop computer, and a smart watch and the association module 204 may assign each of the plurality of portions to each of the recipient's devices. The association module 204 may assign or associate a portion of the file with a device by sending the portion to the device to be stored in a secure location on the device, or to be stored in an encrypted format, until the portion is accessed. In such an embodiment, the association module 204 may encrypt the portions prior to being sent to the devices. In certain embodiments, the portions may be stored and/or sent using different security measures, methods, and/or the like (e.g., using a different encryption scheme for each portion of the file).

In certain embodiments, the recipient registers or otherwise lists devices that he/she wants to use as devices to be associated with a portion of the file. In such an embodiment, the association module 204 may audit each of the registered devices to determine specifications of each device such as the authentication methods of each device, the applications available on the devices, how often the devices are used/accessed, and/or the like. The association module 204 may reference or check the recipient's registered devices to determine how many devices the recipient has registered, which devices the user has registered, a priority order for selecting the recipient's devices for storing portions of the file, and/or the like.

In one embodiment, the association module 204 randomly selects the recipient's electronic devices that are associated with the plurality of portions and randomly associates each of the plurality of portions with a different one of the randomly selected recipient's electronic devices. For instance, the association module 204 may randomly select devices from the list of the recipient's registered devices that can each store or access a portion of the file. In certain embodiment, the recipient devices are selected based on the authentication methods of the devices, e.g., one may require a username/password combination, one may require biometric information, and/or the like, so that different authentication methods are required to view the file. In such an embodiment, the desired authentication methods may be selected based on a sensitivity level of the file, e.g., more restrictive authentication methods may be preferred for "confidential" files.

In some embodiments, the association module 204 stores the plurality of portions separately at one or multiple secure, remote locations that are external to the recipient's devices. In such an embodiment, each portion is logically associated with a recipient's device and can only be accessed using the associated recipient's device. For example, each portion may be encrypted or otherwise securely stored, e.g., using an identifier for a recipient's device that is associated with the portion, such that the portion is only made available to the recipient's devices that are associated with or assigned to the portion, instead of storing the portions directly on the recipient devices.

In certain embodiments, the portions are stored directly on the recipient's devices in a secure location, e.g., in a trusted platform module portion of the device's storage, on an encrypted drive, in an encrypted folder, and/or the like, and may be stored in an encrypted form. In this manner, the recipient may need to login or otherwise provide credentials to authenticate with the device that the recipient is the real or actual owner/user of the device prior to the portion being accessible.

In one embodiment, the file dividing module 202 determines the number of portions of the file to generate based on the number of the recipient's devices that will be associated with the portions. For instance, the file dividing module 202 may query the association module 204 to determine how many of the recipient's devices will be associated with the portions of the file based on the recipient and the number of devices the recipient has registered to be associated with portions of the files prior to dividing the file into its various portions.

In one embodiment, the assembly module 206 is configured to assemble the plurality of portions of the file for the recipient in response to authenticating the recipient on each of the recipient's electronic devices that is associated with a portion of the plurality of portions of the file. For example, if the file dividing module 202 divided the file into two different portions, and the association module 204 associated the first portion with the recipient's smart phone and the second portion with the recipient's smart watch, the assembly module 206 may access the first portion from the recipient's smart phone and the second portion from the recipient's smart watch in response to the recipient authenticating or logging into the smart phone and smart watch (e.g., the portions may be received via a wireless connection such as Wi-Fi, Bluetooth®, NFC, and/or the like).

In one embodiment, the assembly module 206 assembles and makes available the file on one of the recipient's electronic devices that is not associated with a portion of the plurality of portions of the file. For example, instead of making the assembled file available on the recipient's smart phone and smart watch that were associated with the portions of the file, the assembly module 206 may make the file available on the recipient's laptop or desktop computer, a smart television, a tablet computer, and/or the like, which the recipient may designate beforehand.

In one embodiment, the assembly module 206 checks the metadata for each of the portions to determine a predefined order for accessing the plurality of portions for assembling the file. For instance, the metadata may specify that the portion that is associated with the recipient's smart phone should be accessed before the portion associated with the recipient's smart watch. In certain embodiments, one portion of the plurality of portions is not accessible until a previous portion of the plurality of portions in the predefined order has been accessed. Thus, in the previous example, the portion that is associated with the recipient's smart watch may not be accessible until the portion that is associated with the recipient's smart phone has been accessed. Accordingly, in such an embodiment, when a portion is accessed in order, the assembly module 206 sets or sends a flag, bit, or the like to indicate that the portion has been accessed, which then unlocks the following portion for access.

In one embodiment, the assembly module 206 assembles the file on a recipient's device and stores the assembled file in volatile memory while the recipient views the file so that the assembled file is not persistently stored on the recipient's device. In some embodiments, the assembly module 206 may store the assembled file in an encrypted format and/or in a secure storage area of the recipient's device such as on an encrypted storage drive or volume.

In various embodiments, the recipient's electronic device that is used to view the assembled file comprises a head-mounted display executing a mixed reality environment comprising one or more of a virtual reality environment and an augmented reality environment. In such an embodiment, the assembly module 206 may present the assembled file as a three-dimensional object, or other graphical object, within the virtual reality and/or augmented reality environment and may present animations to visually illustrate assembly of the file from the various different portions.

In certain embodiments, the assembly module 206 assembles the file from the portions of the file and stores the file without allowing the recipient to screenshot the file, make a copy of the file, change the storage location of the file, forward a copy of the file, permanently save the file, and/or the like. In such an embodiment, the assembly module 206 may provide a simple file viewer for viewing the file without providing additional features, functions, or the like for manipulating the file. In one embodiment, the assembly module 206 notifies the sender that the recipient viewed/accessed the assembled file.

Figure 3:
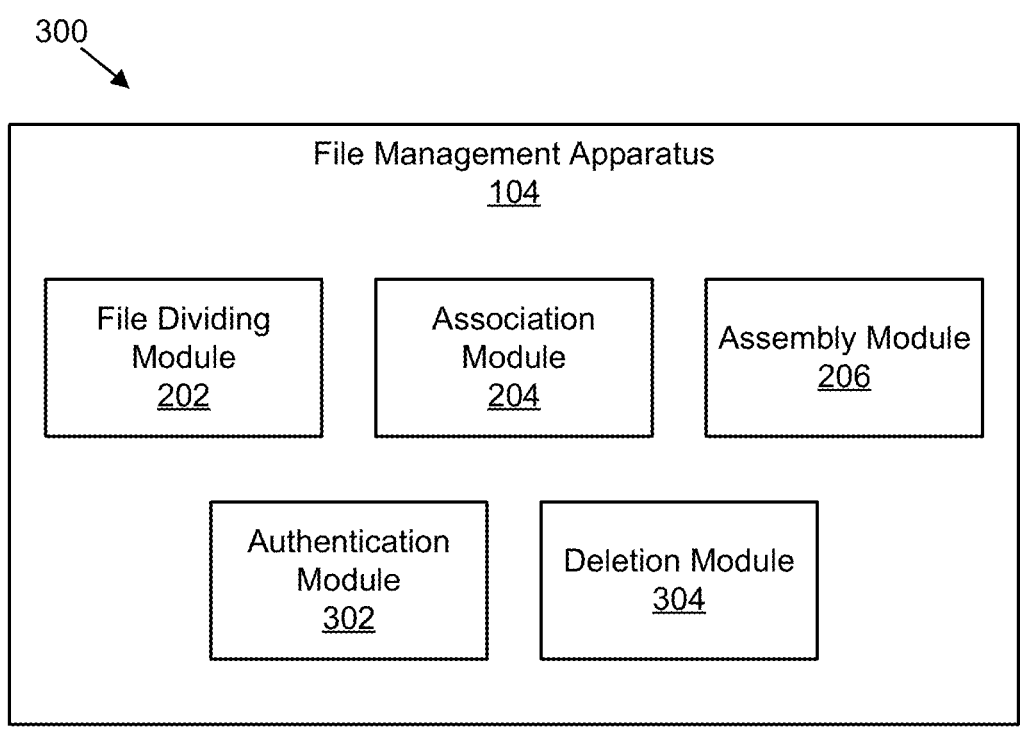
FIG. 3 is a schematic block diagram illustrating one embodiment of another apparatus for secure file distribution.

FIG. 3 is a schematic block diagram illustrating one embodiment of another apparatus 300 for secure file distribution. In one embodiment, the apparatus 300 includes an instance of a file management apparatus 104. The file management apparatus 104, in certain embodiments, includes a file dividing module 202, an association module 204, and an assembly module 206, which may be substantially similar to the file dividing module 202, the association module 204, and the assembly module 206 described above with reference to FIG. 2. The file management apparatus 104, in further embodiments, includes one or more of an authentication module 302 and a deletion module 304, which are described in more detail below.

The authentication module 302, in one embodiment, is configured to authenticate the recipient on the recipient's electronic device that is used to view the assembled file prior to providing access to the assembled file. The authentication module 302 may receive confirmation that the recipient successfully logged into the device, may receive credentials (e.g., username/password, biometric data (e.g., retina scan, fingerprint reader, pulse reading, etc.), and/or the like) for authenticating the user, and/or the like.

In further embodiments, the authentication module 302 verifies that the recipient successfully authenticated at each of the recipient's electronic devices that are associated with each portion of the plurality of portions prior to assembling the plurality of portions of the file for the recipient. The recipient may be authenticated in response to the recipient using credentials to unlock the electronic device, log into an application on the electronic device that verifies the recipient's identity, log into an application for viewing the file, and/or the like. The authentication module 302, for example, may receive a confirmation message when the recipient has logged into each of the devices that are associated with a portion of the file, may check a flag that is set when a recipient logs into a device associated with a portion of the file, and/or the like. In certain embodiments, the authentication module 302 may verify that the recipient is simultaneously logged into each of the devices that have associated portions of the file while viewing the assembled file.

In an embodiment where the viewing device is a head-mounted display, the authentication module 302 authenticates the recipient who is wearing the head-mounted display using biometric information that is captured using various sensors on the head-mounted display. For instance, the authentication module 302 may authenticate the user based on eye/retina information, facial structure/recognition/feature information, breath/odor information, and/or the like.

In one embodiment, the deletion module 304 is configured to delete the assembled file after a period of time. For example, the deletion module 304 may remove, delete, mark for deletion, mark as deleted, overwritten, removed from volatile storage, and/or the like the assembled file after a week, a day, an hour, thirty minutes, thirty seconds, and/or the like. The amount of time may be configurable by the user who sends or makes the file available to the recipient. In one embodiment, the period of time that the timer is set for is triggered or activated in response to the recipient first viewing the assembled file.

In one embodiment, the deletion module 304 is configured to delete a portion of the plurality of portions of the file in response to the portion being accessed to assemble the file. For example, when a portion is accessed from the user's smart phone, or from a remote location that is associated with the user's smart phone, the portion is deleted, removed, marked for deletion, marked as deleted, overwritten, and/or the like so that it is no longer accessible.

In one embodiment, the deletion module 304 begins a timer for expiring one or more portions of the plurality of portions in response to one portion of the plurality of portions being accessed for assembling the file. For instance, when a portion is accessed for assembling the single file, a timer may begin that indicates how much time the recipient has to access the other portions of the file to assemble the complete file before the portions expire and are deleted. In other words, once a portion is accessed on its associated device, the recipient has a certain amount of time to access the remaining portions on the other devices before the deletion module 304 deletes those portions.

Figure 4:
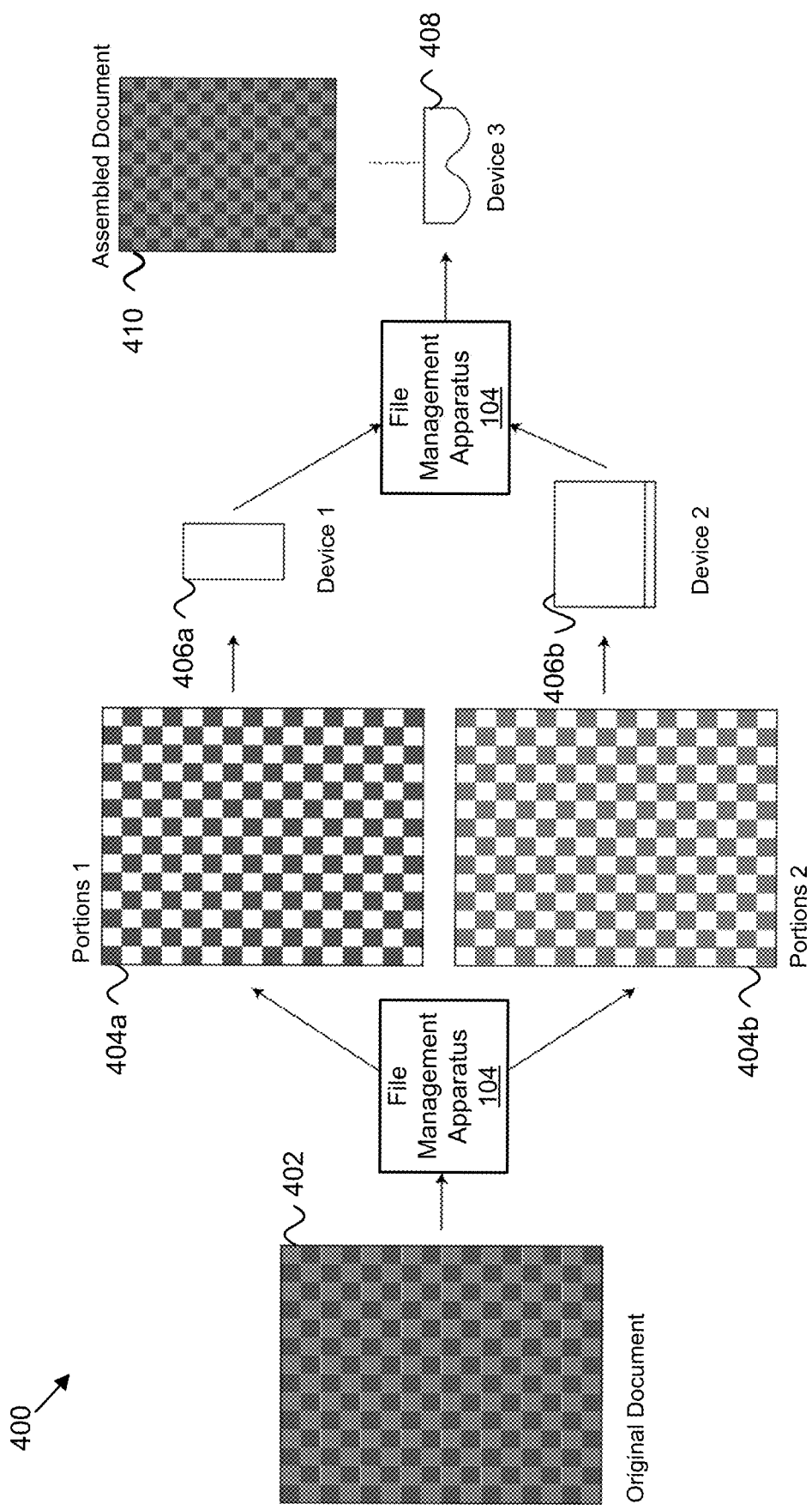
FIG. 4 is a schematic block diagram illustrating one example embodiment of secure file distribution.

FIG. 4 depicts an example of a system 400 for secure file distribution. In one embodiment, the system 400 includes an original document 402, e.g., a resume, a financial spreadsheet, a confidential slideshow presentation, and/or the like. A user may send the original document 402 to an intended recipient. The file management apparatus 104 may process the document 402 prior to it being delivered to the recipient.

In particular, the file dividing module 202 may divide the file into multiple different portions 404a-404b (collectively 404). The association module 204 may associate each portion 404 with the recipient's devices 406a-406b (collectively 406). As explained above, the association module 204 may send and store each of the portions 404 on their respective associated devices 406 or may logically associate the portions 404 with devices 406 while storing the portions in a different location such as a secure remote or cloud storage location.

The assembly module 206 may assemble the portions 404 into the assembled document 410 on another one of the recipient's devices 408 in response to the recipient being authenticated at each of the recipient's devices 406a-406b that has an associated portion 404 of the original document. In this manner, the original document can be securely sent to a recipient in parts such that if a part is intercepted or otherwise misappropriated, the entire document is not compromised because the other portions are needed to reassemble the original document. Furthermore, by associating the portions with the recipient's devices, the portions are only available to the recipient when the recipient is authenticated at the recipient's devices, e.g., by unlocking the device, logging into an application or webpage, using an authenticator application or two-factor authentication, and/or the like.

Figure 5:
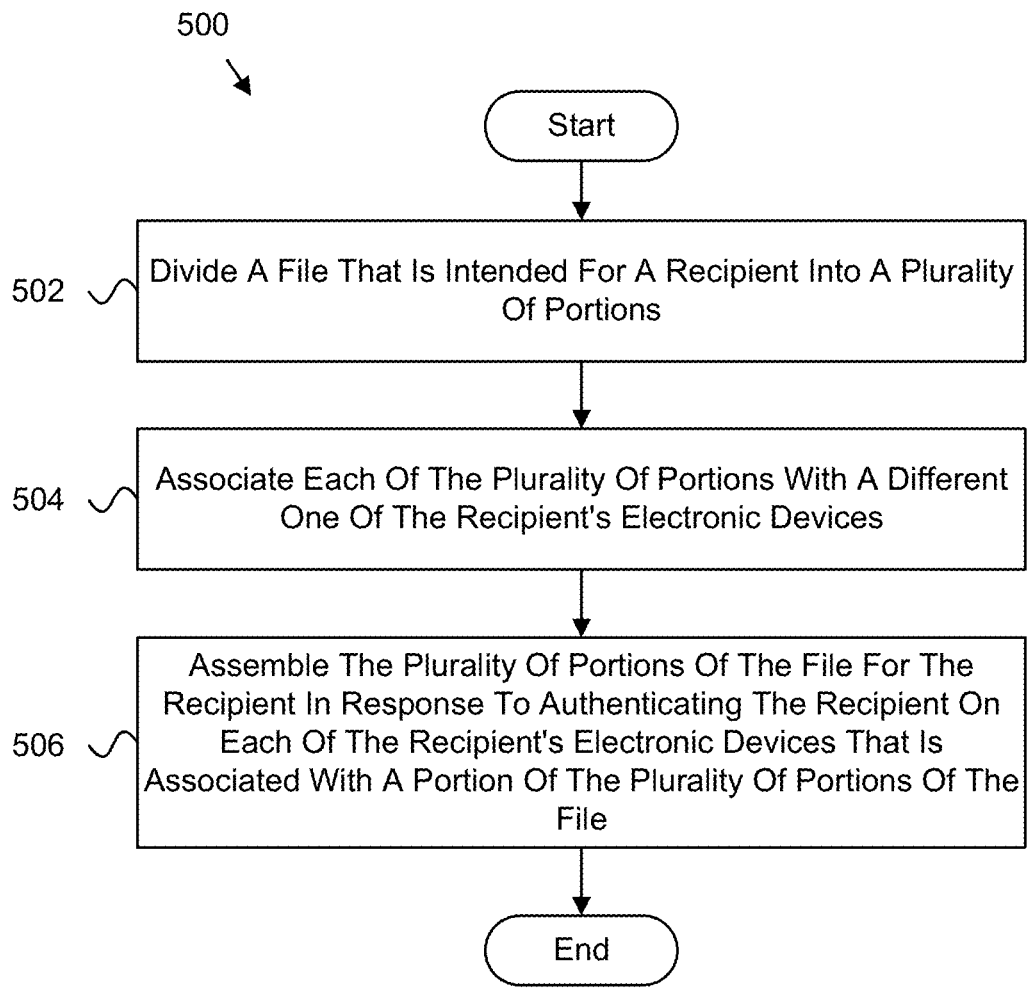
FIG. 5 is a schematic flow chart diagram illustrating one embodiment of a method for secure file distribution.

FIG. 5 is a schematic flow chart diagram illustrating one embodiment of a method 500 for secure file distribution. In one embodiment, the method 500 begins and divides 502 a file that is intended for a recipient into a plurality of portions. In further embodiments, the method 500 associates 504 each of the plurality of portions with a different one of the recipient's electronic devices.

In certain embodiments, the method 500 assembles 506 the plurality of portions of the file for the recipient in response to authenticating the recipient on each of the recipient's electronic devices that is associated with a portion of the plurality of portions of the file, and the method 500 ends. In one embodiment, the file dividing module 202, the association module 204, and the assembly module 206 perform the various steps of the method 500.

Figure 6:
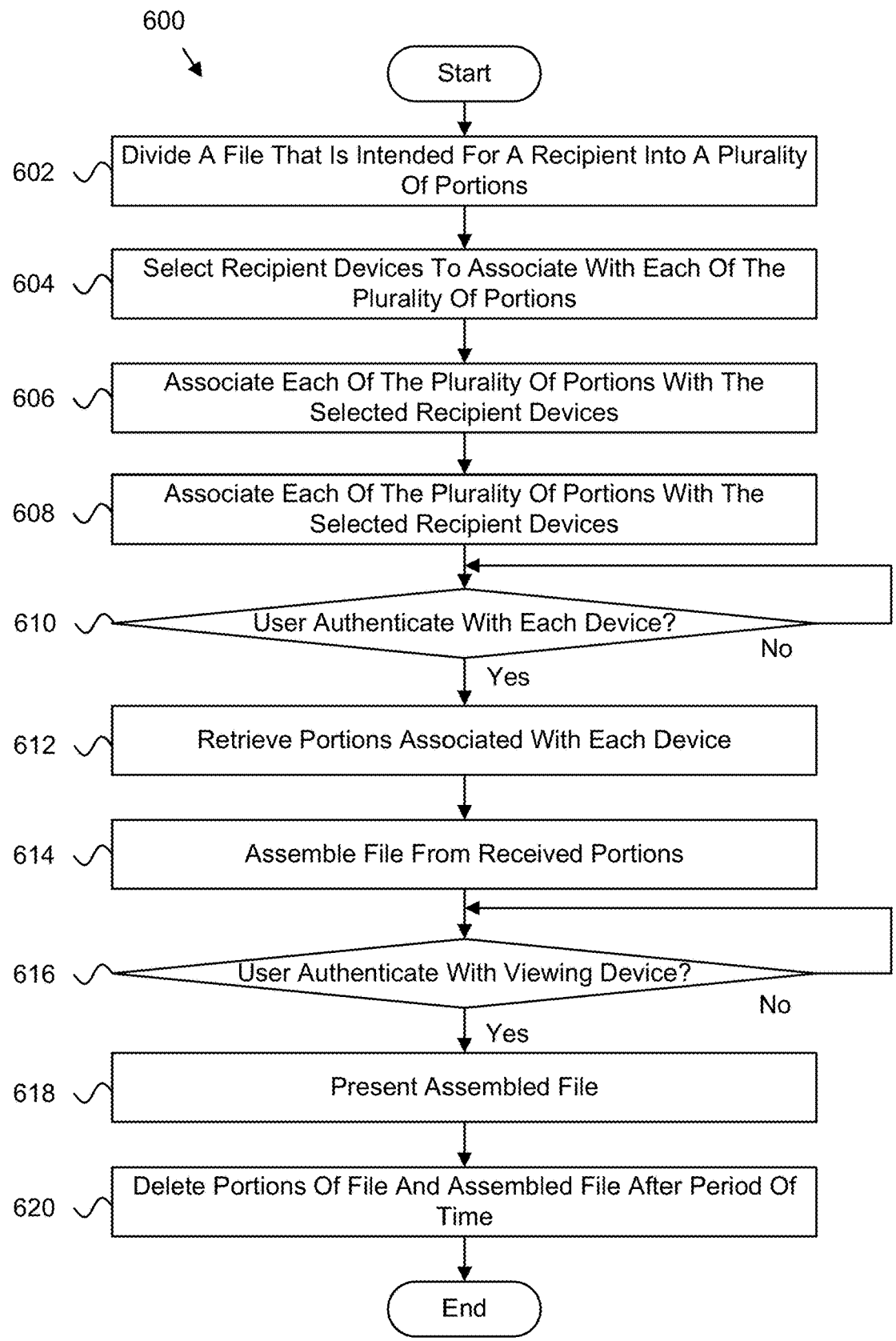
FIG. 6 is a schematic flow chart diagram illustrating one embodiment of another method for secure file distribution.

FIG. 6 is a schematic flow chart diagram illustrating one embodiment of another method 600 for secure file distribution. In one embodiment, the method 600 begins and divides 602 a file that is intended for a recipient into a plurality of portions. In further embodiments, the method 600 selects 604 recipient devices to associate with each of the plurality of portions, e.g., randomly or in some order from a predefined list.

In various embodiments, the method 600 associates 606 each of the plurality of portions with the selected recipient devices. In some embodiments, the method 600 associates 608 each of the plurality of portions of the file with a different one of the selected recipient devices. In further embodiments, if the method 600 determines 610 that the recipient has not authenticated with each of the devices associated with a portion of the file, the method 600 continues to check for the user's authentication.

Otherwise, in one embodiment, the method 600 retrieves 612 each portion of the file from each of the associated recipient devices and/or from a remote/cloud location and assembles 614 the file using the received portions. In certain embodiments, if the method 600 determines 616 that the recipient has not authenticated with the device that is being used to view the assembled file, the method 600 continues to check for the recipient's authentication.

Otherwise, in one embodiment, if the recipient has authenticated with the viewing device, e.g., by unlocking the viewing device, by providing credentials to login to the device or an application executing on the device, and/or the like, the method 600 presents 618 the assembled file on the viewing device. In further embodiments, the method 600 deletes 620 the portions of the file and/or the assembled file after a period of time, and the method 600 ends. In one embodiment, the file dividing module 202, the association module 204, the assembly module 206, the authentication module 302, and the deletion module 304 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
assembling, at a recipient's first device of a plurality of the recipient's devices, the recipient's first device in communication with an electronic display, a plurality of portions of an original file for presentation to the recipient in response to authenticating the recipient on each of the plurality of the recipient's electronic devices that received a separate portion of the plurality of portions of the original file, wherein a sender's device divided the original file into the plurality of portions and transmitted each separate portion of the plurality of portions of the original file to a separate device of the plurality of the recipient's devices, the sender's device comprising a device different from the recipient's devices that receive the plurality of portions of the original file, each of the plurality of the recipient's devices comprising a processor; and displaying a reassembled file on the electronic display, wherein the reassembled file comprises each separate portion the original file that was received at the plurality of the recipient's devices and is assembled from each of the plurality of separate portions of the original file.

2. The method of claim 1, further comprising authenticating the recipient on the device of the recipient that is used to view the reassembled file prior to providing access to the reassembled file.

3. The method of claim 2, further comprising verifying that the recipient successfully is authenticated at each of the devices of the recipient that are associated with each portion of the plurality of portions prior to assembling the plurality of portions of the original file for the recipient.

4. The method of claim 1, further comprising deleting the reassembled file after a period of time, the period of time triggered in response to the recipient first viewing the original file.

5. The method of claim 1, further comprising deleting a portion of the plurality of portions of the original file in response to the portion being accessed to assemble the original file.

6. A computer program product, comprising a non-transitory computer readable storage medium having program instructions embodied therewith, the program instructions executable by a processor to cause the processor to:

assemble, at a recipient's first device of a plurality of the recipient's devices, the recipient's first device in communication with an electronic display, a plurality of portions of an original file for presentation to the recipient in response to authenticating the first recipient on each of the recipient's electronic devices that received a separate portion of the plurality of portions of the original file, wherein a sender's device divided the original file into the plurality of portions and transmitted each portion of the plurality of portions of the original file to a separate device of the plurality of the recipient's devices, the sender's device comprising a device different from the recipient's devices that receive the plurality of separate portions of the original file, each of the plurality of the recipient's devices comprising a processor; and display a reassembled file on the electronic display, wherein the reassembled file comprises each separate portion the original file that was received at the plurality of the recipient's devices and is assembled from each of the plurality of separate portions of the original file.

7. The computer program product of claim 6, wherein program instructions on the first device of the recipient are further configured to authenticate the recipient on the device of the recipient that is used to view the reassembled file prior to providing access to the reassembled file.

8. The computer program product of claim 7, wherein program instructions on the first device of the recipient are further configured to verify that the recipient is successfully authenticated at each of the devices of the recipient that are associated with each portion of the plurality of portions prior to assembling the plurality of portions of the original file for the recipient.

9. The computer program product of claim 6, wherein program instructions on the first device of the recipient are further configured to delete the reassembled file after display without storing the reassembled file on one of the plurality of devices of the recipient.

10. The computer program product of claim 6, wherein program instructions on one or more of the plurality of devices of the recipient comprising a portion of the original file are further configured to delete the portion of the plurality of portions of the original file in response to the portion being accessed to assemble the original file.

11. The computer program product of claim 6, wherein program instructions on the first device of the recipient are further configured to determine a predefined order for accessing the plurality of portions for assembling the original file such that one portion of the plurality of portions is not accessible until a previous portion of the plurality of portions in the predefined order has been accessed.

12. The computer program product of claim 6, wherein program instructions on one or more of the plurality of the devices of the recipient are further configured to begin a timer for expiring one or more portions of the plurality of portions in response to one portion of the plurality of portions being accessed for assembling the original file, wherein in response to expiration of the timer, the one or more of the plurality of devices of the recipient is configured to delete the one or more portions of the plurality of portions.

13. The computer program product of claim 6, wherein program instructions on one or more of the devices of the recipient are further configured to authenticate the recipient on each of the devices of the recipient in response to the recipient using credentials to one or more of unlock the device and log into an application on the device that verifies the recipient's identity.

14. The computer program product of claim 6, wherein program instructions on the first device of the recipient are further configured to assemble and make available the original file on one of the devices of the recipient that is not associated with a portion of the plurality of portions of the original file.

15. The computer program product of claim 6, wherein program instructions on the first device of the recipient are further configured to store the reassembled file in volatile memory of one of the recipient's devices that used to view the original file.

16. The computer program product of claim 6, wherein program instructions on the plurality of devices of the recipient that received a portion of the original file are further configured to store the plurality of portions on one or more of a device that is remote to the devices of the recipient and on the devices of the recipient that are associated with the portions.

17. The computer program product of claim 6, wherein the device of the recipient that is used to view the reassembled file comprises a head-mounted display executing a mixed reality environment comprising one or more of a virtual reality environment and an augmented reality environment.

18. The computer program product of claim 6, wherein program instructions on the first device of the recipient are further configured to authenticate the recipient wearing the head-mounted display using biometric information captured from the recipient's eyes.

19. The computer program product of claim 6, wherein the original file is divided into the plurality of portions using a pattern such that each of the plurality of portions of the original file comprises sections of the original file that are not contiguous and assembling the plurality of portions of the original file to create the reassembled file comprises assembling sections of each portion of the plurality of portions interleaved in an order prescribed by the pattern to create the reassembled file.

\* \* \* \* \*